United States Patent [19]

Wolf

[11] Patent Number: 4,872,365
[45] Date of Patent: Oct. 10, 1989

[54] REMOTE ACTUATOR FOR TRIP VALVE

[75] Inventor: Jeffrey Wolf, Hatboro, Pa.

[73] Assignee: Teleflex Incorporated, Limerick, Pa.

[21] Appl. No.: 203,268

[22] Filed: Jun. 7, 1988

[51] Int. Cl.⁴ .......................... F16K 31/46; F16L 1/10
[52] U.S. Cl. .................................. 74/501.6; 74/500.5;
74/506; 251/77; 251/294
[58] Field of Search .................. 74/506, 502.5, 502.6,
74/500.5, 501.6, 502.4, 480 R, 480 BX, 89.2,
89.44, 526; 251/80, 294, 288, 77

[56] References Cited

U.S. PATENT DOCUMENTS

| 1,095,295 | 4/1914 | Stevens | 251/294 |
|---|---|---|---|
| 1,619,117 | 9/1925 | Gray | 251/294 |
| 2,149,040 | 2/1939 | Binder | 74/18.2 |
| 2,415,099 | 2/1947 | Hooper | 74/480 A |
| 3,183,301 | 5/1965 | Kompanek | 74/502.5 |
| 3,813,080 | 5/1974 | Rogers | 74/527 |
| 3,828,624 | 8/1974 | Wiegand | 74/506 |
| 3,958,524 | 5/1976 | Cantley | 74/480 B |
| 4,483,211 | 11/1984 | Hurlow | 74/501.6 |

FOREIGN PATENT DOCUMENTS 59-134036 8/1984 Japan .................................. 74/502.5

*Primary Examiner*—Gary L. Smith
*Assistant Examiner*—Flemming Saether
*Attorney, Agent, or Firm*—Reising, Ethington, Barnard, Perry & Milton

[57] ABSTRACT

A motion transmitting remote control assembly (10) of the type for transmitting forces along a curved path by a flexible motion transmitting core element (14) including a conduit (12) for slideably supporting the core element (14). An actuator assembly (18) including a handle (26) fixedly secured to a cable gear (24) engages a first core element (14) and imparts movement thereto. The first core element (14) has a first slug (58) fixedly secured on the end thereof. The first slug (58) is slideably retained in a passageway (60) defined by a sleeve (56), defining a first lost motion connection between the first core element (14) and the sleeve (56). A second core element (38) is provided for actuating a valve (36). The second core element (38) has a second slug (62) thereon and is slideably retained in the passageway (60) for providing a second lost motion connection between the second core element (38) and the sleeve (56).

15 Claims, 3 Drawing Sheets

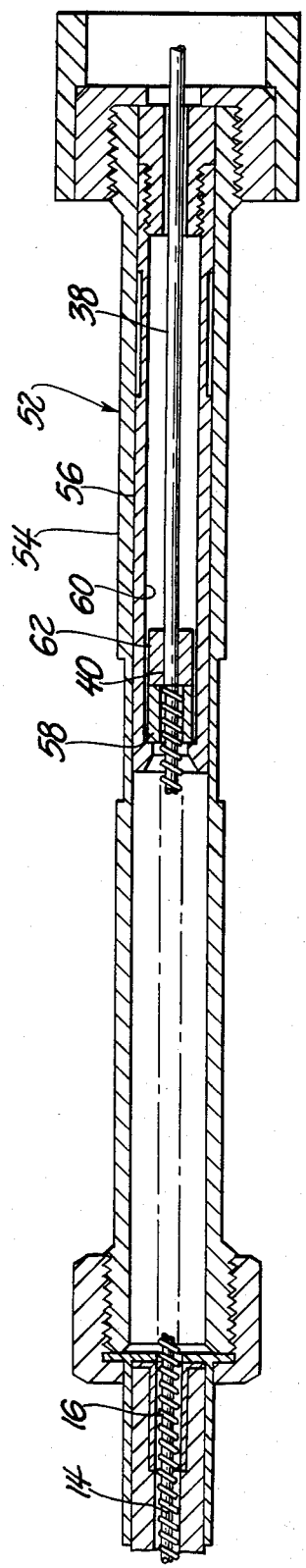
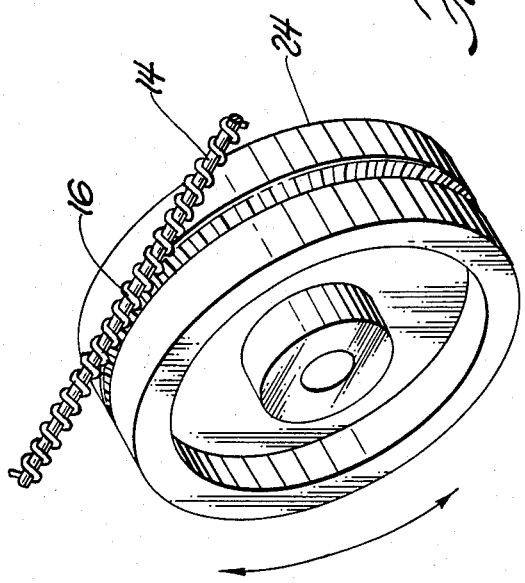
Fig. 3
Fig. 4

REMOTE ACTUATOR FOR TRIP VALVE

FIELD OF THE INVENTION

The subject invention relates to a motion transmitting remote control assembly of the type for transmitting forces along a curved path by a flexible motion transmitting core element movably supported by a conduit.

BACKGROUND ART

On a ship, it is desirable in some instances, to have a valve actuator located remotely from the valve itself. One such instance is in the case of a quick closure valve for fuel. It is desirable to have an actuator for such valves at several locations on board the ship remote from the valve so that if the need arises, the valve can be actuated without being at the valve site itself.

It is well known in the prior art to use a motion transmitting remote control assembly utilizing a moveable core element to transmit forces from a remote actuator to actuate or trip a valve. These actuators are typically mounted on support structures such as bulkheads at various locations throughout the ship. These actuators are typically interconnected by a single core element. This core element is directly connected to the valve. There are two common problems which arise from the use of these remote actuators. First, accidental tripping of the valve can be caused by an individual on board the ship who accidentally moves the actuator handle. The second and foremost problem is that movement of the ship in response to external forces causes the valve to be tripped. As the bulkheads on a ship move relative to each other in response to external forces (waves, explosions, etc.), forces tend to pull on the core element which causes the valve to be inadvertently tripped.

U.S. Pat. No. 2,415,099 to Hooper discloses a remote valve actuator assembly. The assembly disclosed shows an actuator located remotely from a valve to be actuated. The actuator handle is connected, by a spring, to a flexible core element which, when movement is imparted thereto, trips the valve. Specifically, as the remote actuator is actuated, a force is imparted to the spring and subsequently to the core element which trips the valve. This spring acts as a shock absorber between the actuator and core element to dampen the forces put on the actuator handle to the core element. This prevents undesirable forces from being transmitted to the valve.

SUMMARY OF THE INVENTION AND ADVANTAGES

There is provided a motion transmitting remote control assembly of the type for transmitting forces in a curved path by a flexible motion transmitting core element. The assembly comprises a conduit, and a first flexible motion transmitting core element movably supported by the conduit. The assembly further comprises actuator means adapted for attachment to the core element and for imparting movement thereto. The assembly further comprises valve trip means remote from the actuator means for actuating a valve. The assembly is characterized by lost motion connection means interconnecting the first core element and the valve trip means for providing a first lost motion connection between the first core element and the lost motion connection means and for providing a second lost motion connection between the lost motion connection means and the valve trip means whereby the lost motion connection means may move axially without imparting movement to either of the first core elements or the valve trip means.

Accordingly, there is provided an assembly which provides a lost motion connection between the first core element and the valve trip means for eliminating the possibility of accidental actuation of the valve. Further, there is provided a second lost motion connection between the valve trip means and the lost motion connection means for allowing relative movement of the bulkheads on the ship without tripping the valve.

FIGURES IN THE DRAWINGS

Other advantages of the present invention will be readily appreciated as the invention becomes better understood by reference to the following detailed description when considered in connection with the accompanying drawings wherein:

FIG. 3 is a cross-sectional view of the lost motion connection assembly made in accordance with the instant invention; and FIG. 4 is a perspective view of the cable gear and core element.

DETAILED DESCRIPTION OF THE DRAWINGS

Figure 1:
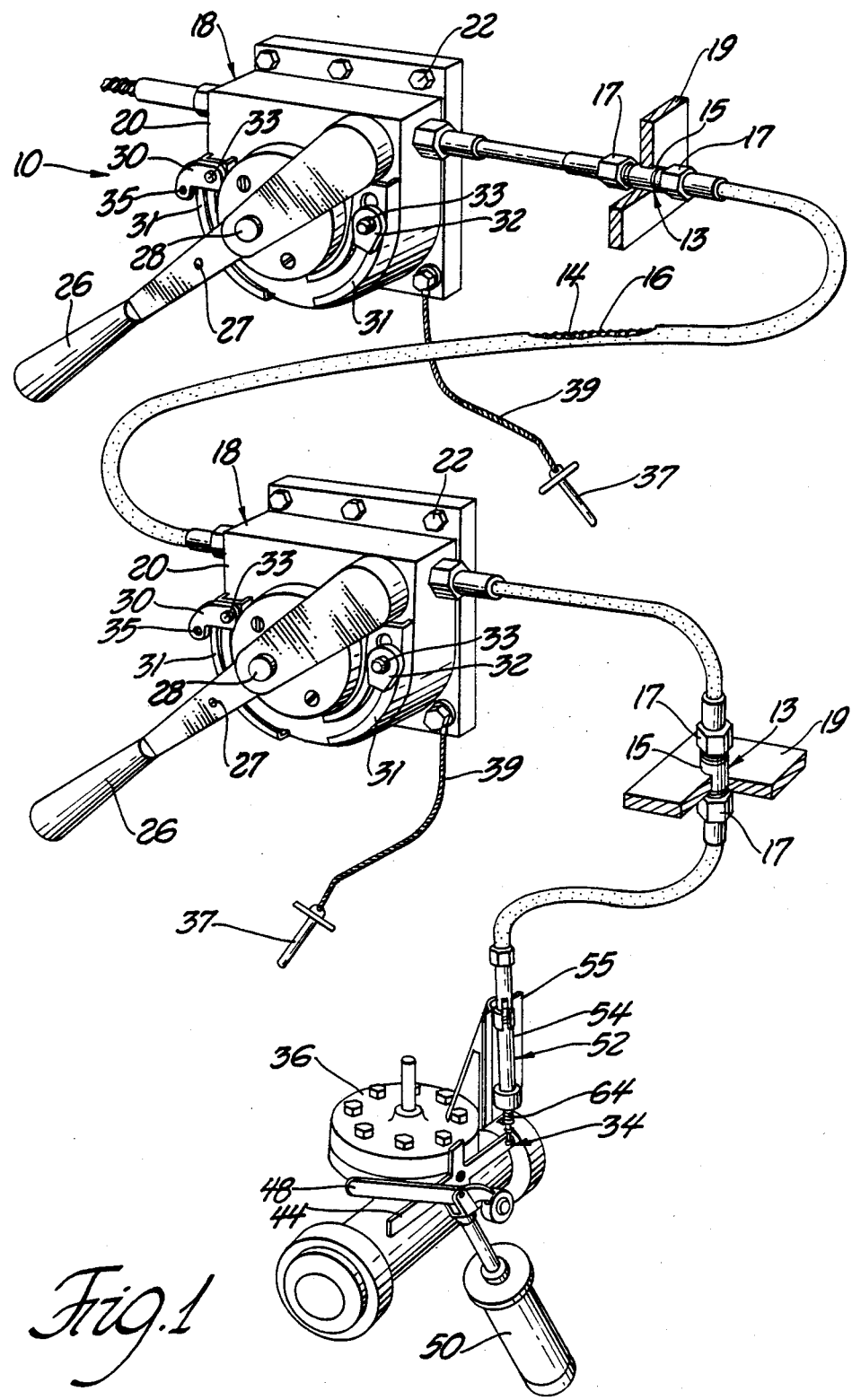
FIG. 1 is a perspective view of an assembly including the instant invention.

A motion transmitting remote control assembly is generally shown at 10 in the Figures. The assembly 10 includes a conduit 12. The conduit 12 is preferably of the type including an inner tubular member made of an organic polymeric material and surrounded by a plurality of long lay wires disposed helically thereabout with a case of organic polymeric material disposed about the long lay wires and the inner tubular member. Similarly, the long lay wires may be disposed about the inner tubular member in a braided fashion. The conduit 12 may include conduit connectors generally indicated at 13. The conduit connectors 13 may include a nipple 15 for passing through a support structure 19 and having male threaded portions at both ends thereof. The conduit 12 may include a nut 17 rotatably disposed on the end thereof for mating engagement with the threaded portions of the nipple 15.

The assembly 10 further includes a first flexible motion transmitting core element 14 movably supported by the conduit 12. The first core element 14 preferably has a wire 16 wrapped helically thereabout. The wire 16 is wrapped such that the windings are spaced along the longitudinal axis of the first core element 14.

The assembly 10 further includes actuator means generally indicated at 18. The actuator means or assembly 18 is adapted for attachment to the first core element 14 and for imparting movement to the first core element 14. The actuator assembly includes an actuator housing 20 adapted for mounting on a support structure such as a bulkhead. Specifically, the housing 20 contains a plurality openings for inserting bolts 22 or similar fastening devices thereto for fixedly securing the housing 20 to the support structure.

The actuator assembly 18 further includes a cable gear 24 rotatably disposed in the actuator housing 20 for engaging the first core element 14. Specifically, the cable gear 24 defines a continuous groove about the perimeter thereof for mating engagement with helically wrapped wire 16 of the first core element 14.

The actuator assembly 18 further includes a handle 26 pivotally mounted to the housing 20 and fixedly secured to the cable gear 24 for imparting rotary movement to the cable gear 24 by moving between a resting position and an actuating position. Specifically, the housing 20 includes a hole therethrough. A shaft 28 is rotatably disposed in the hole in the housing 20. This shaft is fixedly secured at its ends to the handle 26 and at the opposite end to the cable gear 24 for allowing rotary movement imparted to the handle 26 to be transmitted to the cable gear 24. With this connection, rotary movement imparted to the handle 26 is directly transmitted to the cable gear 24 to rotate the cable gear 24. This, in turn, causes the first core element 14 to move longitudinally within the conduit 12. The rotary movement of the handle 26 is converted to linear movement of the first core element 14. The handle 26 may include a hole 27 therethrough for locking the handle 26 as will be described subsequently.

The housing 20 includes a plurality of projections 30, 32 thereon for engaging the handle 26 when in the resting and fully actuating positions, respectively. Specifically, the handle 26 engages the projection 30 when the actuator assembly 18 is in the resting position. When the handle 26 is moved to the fully actuating position, it engages the projection 32.

The projections 30, 32 are adjustable. That is, the housing 20 includes a pair of tracks 31 in which a portion of the projections 30, 32 are slideably disposed. The projections 30, 32 have a male threaded member, preferably a screw or bolt 33 disposed therethrough. A female threaded member, preferably a nut (not shown) is disposed within the housing 20 and receives the screw or bolt 33. Thus, the projections 30, 32 can be adjusted by loosening the screw or bolt 33 and sliding the projection 30, 32 along the tracks 31 to the desired position. Then the screw or bolt 33 can be tightened. Further, the projection 30 may include a hole 35 therethrough. The hole 27 of the handle 26 aligns with the hole 35 of the projection 30. A pin 37 may then be inserted through both holes 27, 35 to lock the handle 26 to the projection 30 and in the resting position. The pin 37 is preferably secured to one of the bolts 22 by a flexible cable 39.

The housing 20 further includes biasing means therein for biasing the handle 26 to the resting position 30. Specifically, the housing 20 preferably includes a flat coil spring 41 therein for biasing the handle 26 to engage the projection 30 when no force is applied to the handle 26. Thus, when no force is imparted to the system, the actuator handle 26 is biased to the resting position. It will be appreciated that other types of springs, such as a compression spring may be used to bias the handle 26 to the resting position 30. The housing 20, however, does not necessarily require a spring to bias the handle 26. The handle 26 is preferably lead filled and statically balanced about the shaft 28. This prevents tripping of the valve by inertial forces.

The assembly 10 further includes valve trip means generally indicated at 34. The valve trip means 34 is located remotely from the actuator assembly 18. The valve trip means or assembly 34 is used to actuate or trip the valve 36. The valve trip assembly 34 includes a second core element 38 having first 40 and second 42 ends. The valve trip assembly 34 further includes a valve trip lever 44 connected to the second end 42 of the second core element 38. Specifically, the valve trip lever 44 has a hole 45 at one end thereof. The second core element 38 passes through the hole 45 and forms a loop at its end. The loop is formed by passing the second core element 38 through the hole 45 and connecting the end of the second core element 38 to another portion of the second core element 38. The connection is made by crimping a hollow tubular member 47 about the second core element 38.

The valve trip lever 44 is pivotally connected to the valve 36 about the pivot pin 46. The pivot pin 46 is located on the valve trip lever 44 at a point spaced from the hole 45 at the end thereof. The valve 36 can be manually tripped without using the actuation assembly by applying force to the manual trip lever 48 located at the valve 36 site, i.e., the manual trip lever 48 is not located remotely from valve 36. The manual trip lever 48 is directly connected to a downwardly biased hydraulic cylinder 50. The cylinder 50 is directly connected to the valve 36. The manual actuator handle 48 and valve trip lever 44 are interconnected such as by a hook (not shown). Thus, the valve trip lever 44 normally holds the manual actuating lever 48 in its unactuated position so as not to allow the hydraulic cylinder 50, which is biased downwardly, to draw the manual actuator handle 48 downwardly and thereby trip the valve. The description of connection of the assembly 10 to the valve 36 and the description of the valve 36 are given with specificity. It will be appreciated, however, that many different types of valves can be utilized within the scope of the present invention.

The assembly 10 is characterized by lost motion connection means 52, interconnecting the first core element 14 and the valve trip means or assembly 34 for providing a first lost motion connection between the first core element 14 and the lost motion connection means 52 and for providing a second lost motion connection between the lost motion connection means 52 and the valve trips means 34 whereby the lost motion connection means 52 may move axially without imparting movement to either of the first core element 14 or the valve trip means 34. Specifically, the lost motion connection means or assembly 52 includes a housing 54 secured to the conduit 12. Inside the housing 54, a sleeve 56 is slideably disposed. Longitudinal movement of the sleeve 56 is limited by the end walls of the housing 54. The housing 54 is fixedly secured to a bracket 55. The bracket 55 is fixedly secured to the value 36.

The first core element 14 has a first slug 58 fixedly disposed on the end thereof. The first slug 58 is slideably retained in the passageway 60 defined by the sleeve 56. The first slug 58 is slideably retained inside the passageway 60 defined by the sleeve 56 for providing a lost motion connection between the first core element 14 and the housing 54.

A second slug 62 is fixedly disposed on the first end 40 of the second core element 38. The second slug 62 is also slideably retained by the passageway 60 defined by the sleeve 56 for providing a lost motion connection between the second core element 38 and the housing 54.

In this assembly 10, there is a lost motion connection between the first core element 14 and the lost motion connection assembly 52 and second lost motion connection between the second core element 38 and the lost motion connection assembly 52. Further, the sleeve 56 can move axially independently of movement of either of the first 14 or second 38 core elements.

The housing 54 is secured to the conduit 12 at one end thereof. The connection may be such as by the housing 54 having a male threaded portion thereon and the conduit 12 have a nut rotatably disposed thereon for mating engagement with the male threaded portion. Further, the housing 54 is secured to a support structure in the form of a bracket 55 attached to the valve 36. The other end of the housing 54 includes a resilient boot 64 secured thereto for allowing the second core element 38 to pass through the boot 38 and into the housing 54 while preventing contaminants (such as dirt) from passing into the housing 54.

In operation, the actuator assembly 18 is secured to a support structure such as a bulkhead on a ship. Any numbers of actuators 18 may be used. All such actuator assemblies 18 are interconnected by a common first core element 14.

Figure 2:
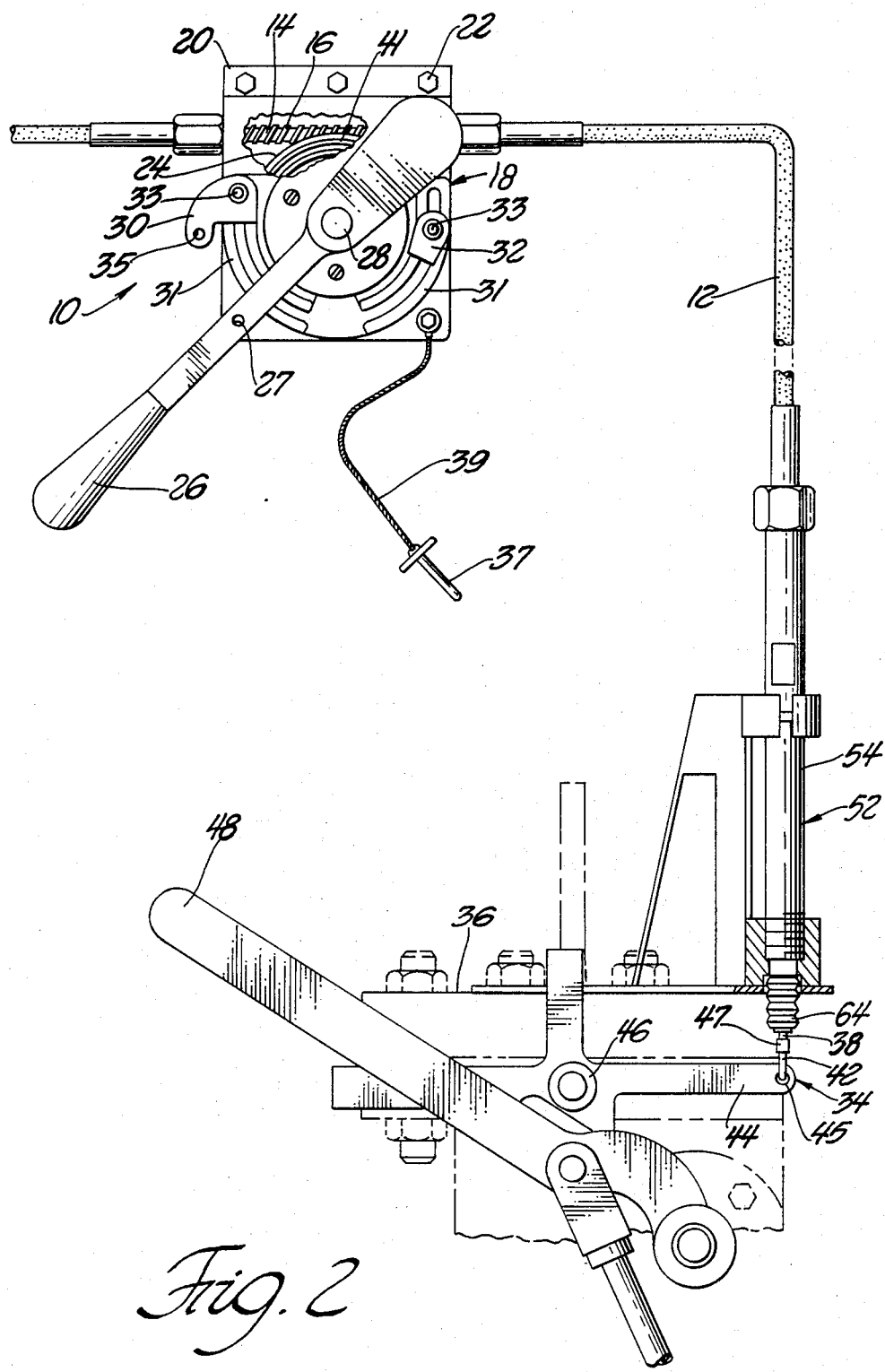
FIG. 2 is a side elevational view partially broken away of an assembly made in accordance with the instant invention.

In the initial, at rest position, the actuator handle 26 is biased into the projection 30 on the actuator housing 20 by a flat coil spring. The first slug 58 attached to the end of the first core element 14 is initially against the front wall of the sleeve 56 (as best viewed in FIG. 3). The second slug 62 attached to the end of the second core element 38 initially abuts the first slug 58. To actuate or trip the valve, the actuator handle 26 is rotated (in a counter clockwise fashion as viewed in FIG. 1) until the handle 26 engages the projection 32 defining the fully actuated position (It will be appreciated that the system could also operate in a reverse orientation, i.e., in a clockwise fashion as viewed in FIG. 1). This movement in turn rotates the cable gear 24 which is fixedly connected to the helical wrap 16 of the first core element 14. This movement is transmitted to the first core element 14 to thereby transform the rotary movement from the handle 26 into linear movement of the first core element 14. The first core element 14 is then pulled and since the slug 58 engages the sleeve 56, the movement in turn pulls the sleeve 56 to the left as viewed in FIG. 3. Movement of the second core element 38 is not effectuated until the handle 26 has been rotated through almost a complete stroke thus allowing the second slug 62 of the second core element 38 to engage the back wall of the sleeve 56. When sufficient movement has been imparted to the handle 26, the back wall of the sleeve 56 engages the second slug 62 of the second core element 38, the sleeve 56 pulls the second slug 62 and second core element 38 to the left as viewed in FIG. 3. This movement of the second core element 38 pulls on the valve trip lever 44, causing the valve trip lever 44 to pivot about the pivot pin 46. The end of the valve trip lever 44 rotates downwardly (as viewed in FIG. 2) in the opposite direction of the pull of the second core element 38. The manual trip lever 48 is then released from the valve trip lever 44 and the hydraulic cylinder 50 is allowed to move, thereby tripping the valve. Thus, the movement of the actuator handle 26 is not imparted to the second core element 38 until the handle 26 is rotated far enough to overcome the lost motion connection between the second core element 38 and the sleeve 56. This effectively prevents inadvertent actuation of the valve by slight movement of the handle 26.

Further, this lost motion connection provides for allowances of external forces on the ship, such as flexing of the ship due to waves or shocks from explosion. Since the bulkheads of the ship can flex relative to one another, this movement necessarily imparts a motion into the first core element 14. Thus, by having a lost motion connection between the second core element 38 and the sleeve 56, slight movement imparted to the first core element 14 by forces external of the actuator due to flexing of the bulkheads relative to one another, will not trip the remote valve 36.

Further, inertial forces may tend to exert a force on the second core element 38 and thereby trip the valve. This is avoided by providing a sleeve 56 which is slideable relative to both the first core elements 14 and the second core element 38. That is, inertial forces on the sleeve 56 may tend to move the sleeve 56 along the axial direction of the first core element 14. The sleeve 56 can move, due to inertial forces, without imparting motion to the second core element 38 because of the lost motion connection between the second core element 38 and the sleeve 56.

To reset the valve, the manual actuating lever 48 must be manually moved, against the biasing of the hydraulic cylinder 50, and engaged with the valve trip lever 44. The valve trip lever is automatically reset by the assembly 10. Specifically, the spring within the housing 20 biases the handle 26 which, through the cable gear 24 exerts a force on the first core element 14. This force is transmitted to the second core element 38 which in turn pulls on the valve trip lever 44. This force moves the valve trip lever 44 to its initial unactuated position. The manual actuating lever 48 is then re-attached to the valve trip lever 44, resetting the assembly 10.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A motion transmitting remote control assembly (10) of the type for transmitting forces in a curved path by a flexible motion transmitting core element (14), said assembly (10) comprising:
 a conduit (12);
 a first flexible motion transmitting core element (14) moveably supported by said conduit (12), said first core element (14) having a first slug (58) disposed on the end thereof;
 actuator means (18) adapted for attachment to said first core element (14) and for imparting movement thereto;
 valve trip means remote from said actuator means (18) for actuating a valve (36) and including a second core element (38) having a second slug (62) disposed on the end (40) thereof;
 said assembly (10) characterized by lost motion connection means (52) including a housing (54) secured to said conduit (12) and a sleeve (56) slideably disposed in said housing (54), said first (58) and said second (62) slugs slideably engaging and supported by said sleeve (56) for establishing a first lost motion connection between said first core element (14) and said sleeve (56) and for establishing a second lost motion connection between said second core element (38) and said sleeve (56) said sleeve (56) having front and back walls for retaining said first (58) and second (62) slugs within said sleeve (56) so that said first slug (58) is moveable relative to said sleeve (56) and abuts said front wall of said sleeve (56) to move said sleeve (56) through a predetermined length in response to a force from said actuator means (18) without imparting movement to said second slug (62) and said second slug (62) is moveable relative to said sleeve (56) and abuts said back wall of said sleeve (56) to move after said sleeve (56) has moved through said predetermined length.

2. An assembly as set forth in claim 1 further characterized by said second core element (38) having first (40) and second (42) ends, said second slug (62) disposed on said first end (40) of said second core element (38).

3. An assembly as set forth in claim 2 further characterized by said actuator means (18) comprising: an actuator housing (20) adapted for mounting on a bulkhead and for attachment to said conduit (12); a cable gear (24) rotatably disposed in said actuator housing (20) for engaging said first core element (14); a handle (26) pivotally mounted to said housing (20) and fixedly secured to said cable gear (24) for imparting rotary movement thereto by moving between a resting position and an actuating position.

4. An assembly as set forth in claim 3, further characterized by said actuator housing (20) including biasing means therein for biasing said handle (26) to said resting position.

5. An assembly as set forth in claim 4 further characterized by said valve trip means (34) including a valve trip lever (44) connected to said second end (42) of said second core element (38), said valve trip lever (44) pivotally connected to a valve (36) spaced from said second end (42) of said core element (38).

6. An assembly as set forth in claim 5 further characterized by said valve trip means (34) including a resilient boot (64) secured to said housing (54) for allowing the second core element (38) to pass therethrough while preventing contaminants from passing into said housing (54).

7. An assembly as set forth in claim 6 further characterized by said first core element (14) having a wire (16) helically wrapped thereabout such that the windings are spaced along the longitudinal axis of the first core element (14), said cable gear (24) defining a continuous groove about the perimeter thereof for mating engagement with said helically wrapped wire (16) of said first core element (14).

8. An assembly as set forth in claim 7 further characterized by said biasing means comprising a coil spring (41) disposed in said housing for biasing said handle to said resting position.

9. An assembly as set forth in claim 8 further characterized by said actuator housing (20) having a plurality of projections (30, 32) thereon for engaging said handle when in said resting and said actuating positions respectively.

10. An assembly as set forth in claim 9 further characterized by said actuator housing (20) having a hole therethrough, said actuator means (18) including a shaft (28) rotatably disposed in said hole and fixedly secured to said handle (26) and said cable gear (24) for allowing rotary movement imparted to said handle (26) to be transmitted to said cable gear (24).

11. An assembly as set forth in claim 10 further characterized by said conduit (12) including conduit connections (13), said conduit connectors (13) comprising a nipple (15) for passing through a support structure and having made threaded portions on the ends thereof.

12. An assembly as set forth in claim 11 further characterized by said conduit (12) including a nut (17) rotatably disposed on the end thereof for mating engagement with the threaded portions of the nipple (15).

13. An assembly as set forth in claim 12 further characterized by said projections (30, 32) being adjustable.

14. An assembly as set forth in claim 13 further characterized by said housing (20) including a plurality of tracks (31), said projections (30, 32) slideably disposed in said tracks (31).

15. An assembly as set forth in claim 14 further characterized by said projections (30, 32) having a male threaded member (33) therethrough, said housing (20) including a female threaded member for receiving said male threaded member (33).

* * * * *